US006062746A

United States Patent [19]

Stoebe et al.

[11] Patent Number: 6,062,746
[45] Date of Patent: May 16, 2000

[54] COMPACT APPARATUS FOR THERMAL FILM DEVELOPMENT AND SCANNING

[75] Inventors: Timothy W. Stoebe, Victor; Lyn M. Irving, Penfield; David H. Levy; Richard P. Szajewski, both of Rochester, all of N.Y.

[73] Assignee: Eastman Kodak Company, Rochester, N.Y.

[21] Appl. No.: 09/206,612

[22] Filed: Dec. 7, 1998

[51] Int. Cl.[7] .............................. G03D 13/00; H04N 1/04

[52] U.S. Cl. .............................. 396/575; 355/27; 355/40; 358/487; 430/350

[58] Field of Search .................................... 396/512, 516, 396/575, 571, 567, 319, 320; 355/27, 28, 75, 40; 358/506, 474, 487; 219/216; 430/350, 353

[56] References Cited

U.S. PATENT DOCUMENTS

| | | | |
|---|---|---|---|
| 4,021,240 | 5/1977 | Cerquone et al. . | |
| 4,194,826 | 3/1980 | Lewis | 396/575 |
| 4,653,890 | 3/1987 | Nordstrom et al. | 396/575 |
| 4,832,275 | 5/1989 | Robertson . | |
| 4,834,306 | 5/1989 | Robertson et al. . | |
| 4,965,628 | 10/1990 | Olliver et al. . | |
| 5,003,334 | 3/1991 | Pagano et al. . | |
| 5,031,852 | 7/1991 | Dowling et al. . | |
| 5,032,854 | 7/1991 | Smart et al. . | |
| 5,200,777 | 4/1993 | Zander . | |
| 5,215,874 | 6/1993 | Sakakibara . | |
| 5,226,613 | 7/1993 | Kataoka et al. . | |
| 5,229,585 | 7/1993 | Lemberger et al. . | |
| 5,587,767 | 12/1996 | Islam et al. . | |
| 5,667,944 | 9/1997 | Reem et al. . | |
| 5,684,610 | 11/1997 | Brandestini et al. . | |
| 5,698,365 | 12/1997 | Tuguchi et al. . | |
| 5,858,629 | 1/1999 | Ishikawa et al. . | |

FOREIGN PATENT DOCUMENTS

| | | |
|---|---|---|
| 2318645 | of 0000 | United Kingdom . |

OTHER PUBLICATIONS

Research Disclosure 17029, Jun. 1978, Photothermographic Silver Halide Systems.

Research Disclosure 29963, Mar. 1989, Photothermographic Silver Halide Systems.

*Primary Examiner*—Alan A. Mathews
*Attorney, Agent, or Firm*—Paul A. Leipold

[57] ABSTRACT

The invention relates to an apparatus for thermal development comprising a receiving chamber for a thrust cartridge, drive means to advance thermal film from said thrust cartridge and rewind film into said thrust cartridge, a magnetic reader and writer to read and write magnetic information onto the film, an accumulator to gather said film after it has left the cartridge, a heater located between said chamber and said accumulator to develop said thermal film as it passes between said cartridge and said accumulator, an optical scanner to produce an electronic file representation of the film image information, and a lighttight container for said chamber, heater, and accumulator.

38 Claims, 6 Drawing Sheets

COMPACT APPARATUS FOR THERMAL FILM DEVELOPMENT AND SCANNING

FIELD OF THE INVENTION

The present invention relates to a method and apparatus for processing thermally developable film. It particularly relates to a compact apparatus and method for developing film by applying heat to the film. It further relates to a method and apparatus to scan thermally developable film.

BACKGROUND OF THE INVENTION

In the conventional practice of color photography, silver halide film is developed by a chemical technique, requiring several steps consisting of latent image development, bleaching, and fixing. While this technique has been developed over many years and results in exceptional images, the technique requires several liquid chemical solutions and precise control of times and temperatures of development. Further, the conventional silver halide chemical development technique is not particularly suitable for utilization with compact developing apparatus. The chemical technique also is not easily performed in the home or small office.

Imaging systems that do not rely on conventional wet processing have received increased attention in recent years. Photothermographic imaging systems have been employed for producing silver images. Typically, these imaging systems have exhibited very low levels of radiation-sensitivity and have been utilized primarily where only low imaging speeds are required. The most common use of photothermographic elements is for copying documents and radiographic images. A method and apparatus for developing a heat developing film is disclosed in U.S. Pat. No. 5,587,767—Islam et al. Summaries of photothermographic imaging systems are published in *Research Disclosure,* Vol. 170, June 1978, Item 17029, and Vol. 299, March 1989, Item 29963. Thermally developed films have not been generally utilized in color photography. However, heat development color photographic materials have been disclosed, for example, in U.S. Pat. No. 4,021,240—Cerquone et al and U.S. Pat. No. 5,698,365—Taguchi et al, and commercial products such as Color Dry Silver supplied from Minnesota Mining and Manufacturing Co. and PICTROGRAPHY® and PICTROSTAT® supplied by Fuji Photo Film Co., Ltd. have been put on the market. Furthermore, U. K. Publication 2,318,645 discloses an imaging element capable of providing a retained viewable image when imagewise exposed and heated. It is proposed that such an element could comprise a color thermal film for photography that delivers satisfactory pictures.

A recent innovation in color negative film has made use of a thrust cartridge containing color negative film. Such cartridges are disclosed in U.S. Pat. No. 4,834,306–Robertson et al and U.S. Pat. No. 5,003,334—Pagano et al. The film contained in such a thrust cartridge may contain a magnetic layer that allows recording of information during manufacture, exposure, and development of the film. Such film is disclosed in U.S. Pat. No. 5,215,874—Sakakibara. The film and cartridge may contain additional provisions for data storage such as DX bar code data and frame number bar code data. Such elements are disclosed in U.S. Pat. No. 5,032,854—Smart et al, U.S. Pat. No. 5,229,585—Lemberger et al, and U.S. Pat. No. 4,965,628—Olliver et al. The thrust cartridge may also be made lighttight so that unexposed or imagewise exposed film that has been rewound into the cartridge may be stored without further exposure of the film within the cartridge. These thrust cartridge films have the advantage that they may be more easily manipulated for copying, digital reading, and storage.

The importance of information such as film type, film speed, film exposure information, and information relevant to the processing and subsequent use (e.g. printing or optical scanning) of the film is well understood. Virtually transparent magnetic layers or stripes on film provide a means to record such information. These magnetic layers or stripes provide for the recording of information during film manufacture, reading and/or recording of information during camera use, and reading and/or recording information during subsequent processing or optical scanning. There is a need to read and write magnetic data on thermographic film associated with the thermal processing. There is also a need to read and write magnetic data on thermographic film associated with the optical scanning. Reading and writing information on a magnetic coating or stripe on thermographic film requires solutions to problems different than those encountered in other apparatus. For example, the thermal development conditions may degrade and potentially erase the magnetic information stored on the film. There is therefore a need to read and store the magnetic information so that it may be rewritten onto the film after thermal processing.

The function of a film scanner is to measure optical density at many points on the film being scanned. The density of each pixel, or smallest region of the film being sensed, is measured by illuminating the region with light of a known light intensity and measuring the intensity of the light which is transmitted through the film. Color scans require measuring transmitted light intensity over known spectral bands. Such techniques are disclosed in U.S. Pat. No. 5,684,610—Brandestini et al. The transmitted light intensity may be measured electronically and the electronic record of the transmitted light may be digitized and stored as an electronic file representation of the film image.

The importance and utility of an electronic record of film images is widely known in the art. The electronic file may be easily duplicated and extensively manipulated. Color balance and tone scale may be adjusted. Sharpening and other algorithms to alter image structure may be applied. Annotations and/or graphical elements may be added to the film image data file. The scene may be easily cropped and digitally zoomed. An electronic record of a film image may be easily transmitted and communicated through existing electronic communication networks. The electronic record of a film image may also be output to a variety of output devices including ink-jet and thermal wax digital printers. The electronic record may also be manipulated and stored in mass storage devices for rapid retrieval and subsequent processing. There is a need to optically scan thermographic film to provide an electronic file record of the film image information.

PROBLEM TO BE SOLVED BY THE INVENTION

There is a need for a compact color film system that may be easily processed and utilized in the small office or home. There is a need for a compact thermal development film system with the capability to scan the thermally developable film. There is also a need for a compact thermal development film system with the capability to read and write magnetic information on the film.

SUMMARY OF THE INVENTION

It is an object of the invention to overcome disadvantages of prior apparatus and processes for thermal film and the complicated, awkward procedures for wet-processing conventional films.

It is another object to provide an improved method of development of thermal film in a cartridge.

It is another object to provide more convenient and rapid processing of thermal film to the individual user.

It is another object to provide a means to scan the thermal film.

These and other objects of the invention are accomplished by an apparatus for thermal development comprising a receiving chamber for a thrust cartridge, drive means to advance thermal film from said thrust cartridge and rewind film into said thrust cartridge, magnetic sensing devices to record and write magnetic information, an accumulator to gather said film after it has left the cartridge, a heater located between said chamber and said accumulator to develop said thermal film as it passes between said cartridge and said accumulator, a scanning means to scan the thermal film, and a lighttight container for said magnetic devices, chamber, heater, and accumulator.

ADVANTAGEOUS EFFECT OF THE INVENTION

The invention provides a compact, convenient apparatus and method for processing of film contained in a thrust cartridge. It provides a means to scan the thermal film to form an electronic record of image data that may be readily processed, printed, and transmitted. It provides a means to record and write magnetic information to effect optimal subsequent processing. It provides an apparatus and a method of processing of color thermal films that is convenient and compact.

DETAILED DESCRIPTION OF THE INVENTION

The invention has numerous advantages over prior methods of processing thermal film, particularly thermal film provided with means to store magnetic information contained in thrust cartridges. The system of the invention has the advantage that the individual user of thermal film cartridges may process the cartridges in a convenient and low-cost system. The apparatus of the invention has the advantage that magnetic information may be sensed and written on to the film. This information may be used to control subsequent processing or optical scanning. The invention has the advantage that it provides an optical scanner to create an electronic file record of film image information. The invention further has the advantage that it provides a means that is easily connected to a personal computer for control and development of thermal film. The invention provides an apparatus that is low in power requirements, while producing rapid developing for the individual user. The invention provides an apparatus and method that is easily transported. These and other advantages will be apparent from the detailed description below.

Figure 1:
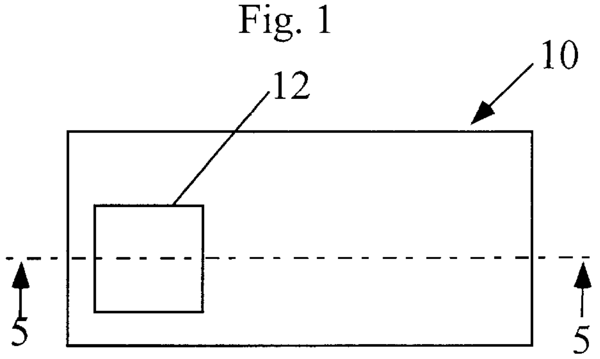
FIG. 1 is a top view of compact thermal development apparatus of the invention.
Figure 2:
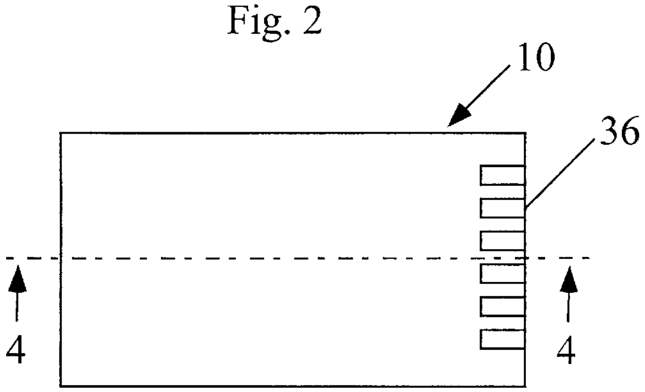
FIG. 2 is a side view of the apparatus of the invention.
Figure 3:
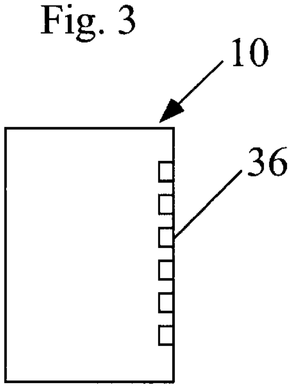
FIG. 3 is an end view of the apparatus of the invention.
Figure 4:
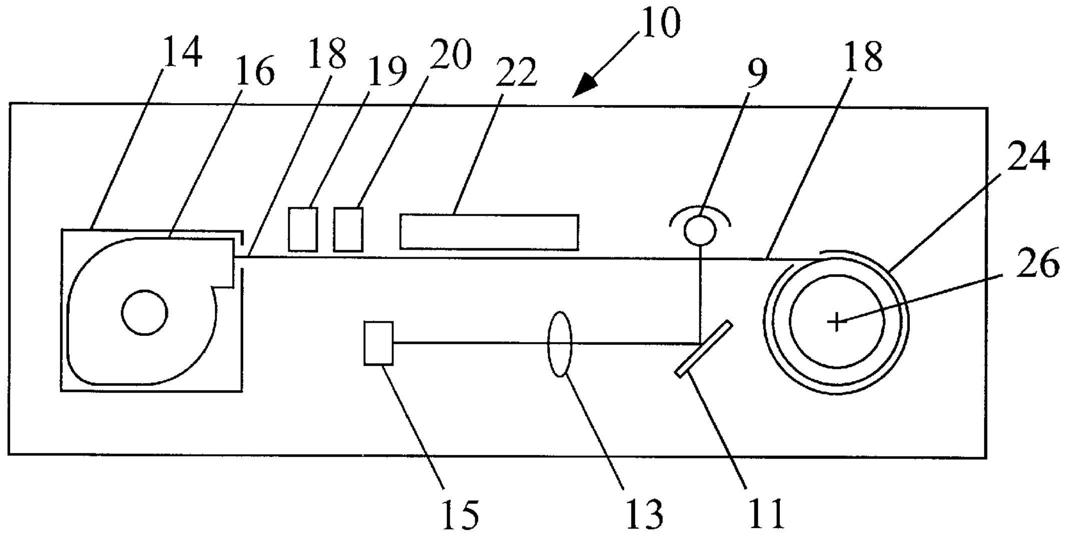
FIG. 4 is a cross-sectional view on line 4—4 of FIG. 2.
Figure 5:
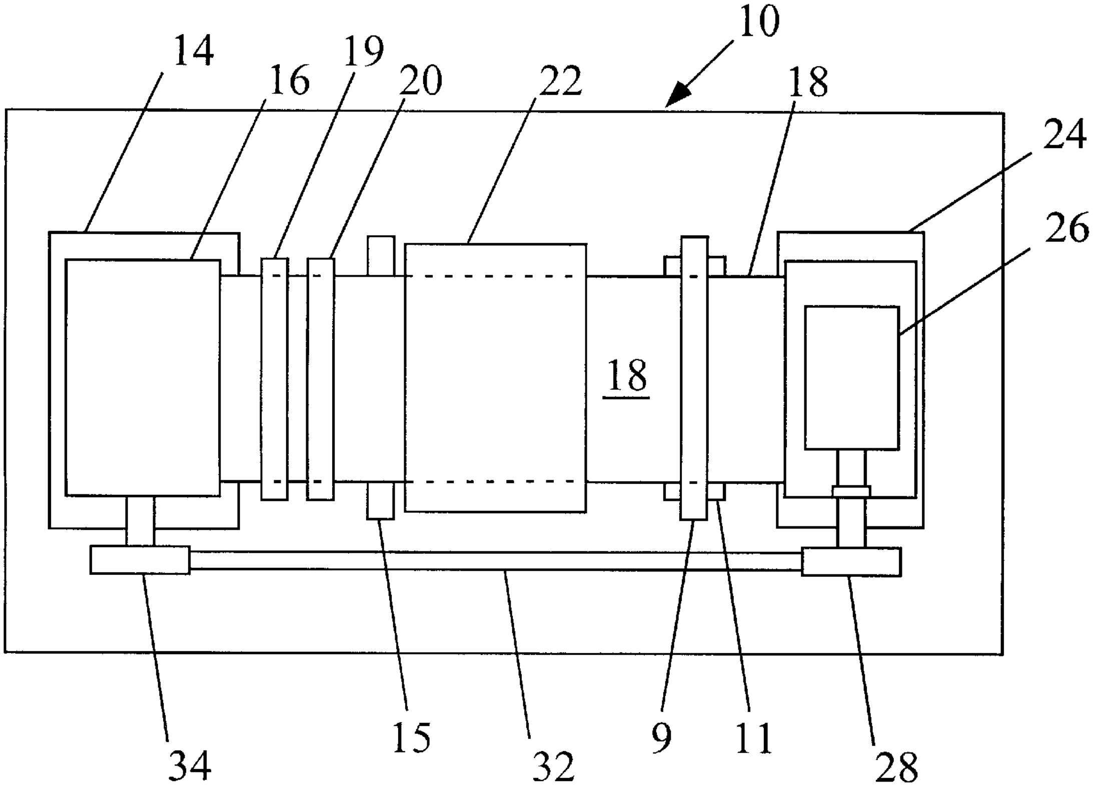
FIG. 5 is a cross-sectional view on line 5—5 of FIG. 1.

As illustrated in FIGS. 1, 2, and 3, there is provided compact development apparatus device 10. The apparatus 10 is lighttight so that the thermal film is not exposed to light prior to the thermal development. The apparatus has a lighttight door 12 for opening and inserting a thrust cartridge. The apparatus 10 further is provided with electrical contacts 36 for providing power and control to the apparatus. As shown in FIG. 4, the device 10 contains a chamber 14 for accepting the thrust cartridge 16. The thrust cartridge as it is unwound has film 18 pass into accumulator 24. The film 18 is then wound onto accumulator 24. Accumulator 24 is driven by motor 26 located within the accumulator 24. In FIG. 5, the drive for cartridge 16 is shown to be transmitted from motor 26. Motor 26 transfers through driven sprocket 28 through a series of gears 32 to sprocket 34 that simultaneously drives film from thrust cartridge 16 as it is wound into accumulator 24. As the film 18 passes between the thrust cartridge 16 and accumulator 24, it passes over a heater 22. As the film 18 passes between the thrust cartridge 16 and accumulator 24, it passes over a magnetic reading head 19 and a magnetic writing head 20.

A typical scanning apparatus utilizes a light source to provide illumination and an optical detector to determine the optical density of the film by measuring the intensity of the light transmitted through the film. An imagewise scan of a film image frame may be obtained by using an appropriate light source and a linear detector array that scans the entire width of the film as the film is driven lengthwise across the scanning apparatus. In FIG. 4, the film 18 is shown to pass between a light source 9 and a mirror 11 as the film 18 is thrust between the thrust cartridge 16 and accumulator 24. The light generated by light source 9 and transmitted through the film 18 is reflected by mirror 11 and focused by lens system 13 to be detected by optical detector 15. The electronic record of the film image data may be created by recording the output of the optical detector in relation to the relative position of the film image frame and the optical scanner.

Figure 6:
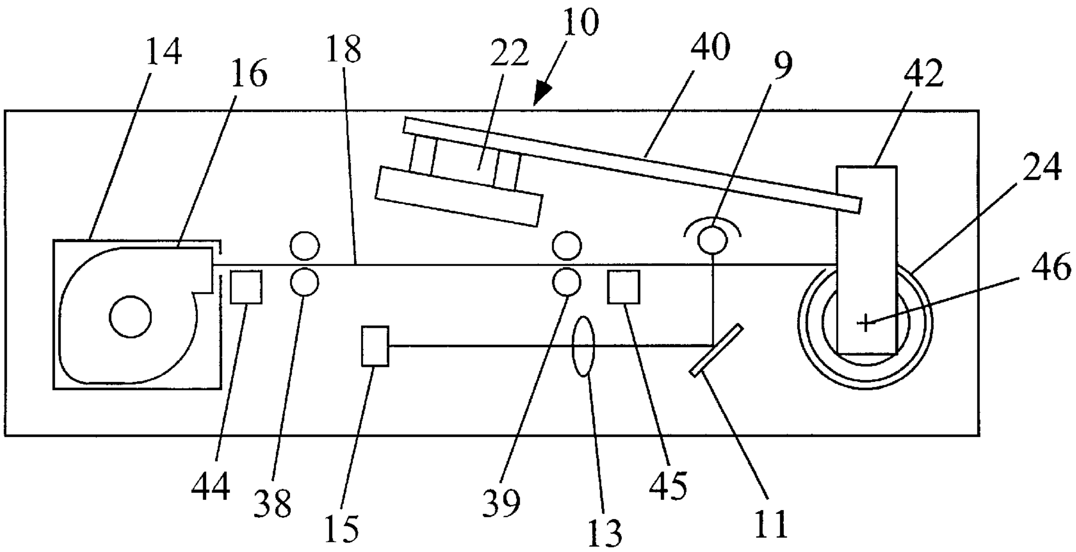
FIG. 6 is an alternative cross-sectional view on line 4—4 of FIG. 2 showing means to remove the heater from film path.

In FIG. 6, the film 18 is shown to pass through guide rollers 38 and 39, and the heater 22 is shown to be supported by an armature 40 that may be actuated by a motor 46 located within the accumulator 24 through an assembly of gears 42 to translate the heater 22 into and out of close proximity to the path of the film 18. The mechanism is constructed to actuate the armature in response to preset conditions or in response to signals provided by sensors 44 and 45. Sensors 44 and 45 are designed to monitor a plurality of parameters including film speed, film location, temperature, frame advancement, and fault conditions such as film breakage, film jam, and heater malfunction.

Figure 7:
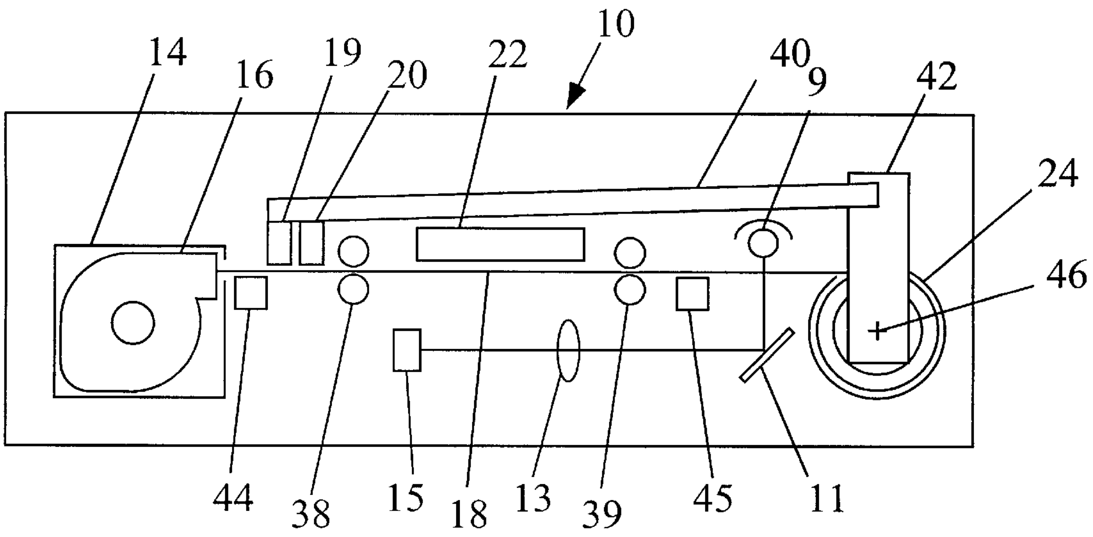
FIG. 7 is an alternative cross-sectional view on line 4—4 of FIG. 2 showing means to remove the magnetic reader and magnetic writer from film path.

In FIG. 7, the film 18 is shown to pass through guide rollers 38 and 39, and the magnetic writing head 20 and magnetic reading head 19 are shown to be supported by an armature 40 that may be actuated by a motor 46 through an assembly of gears 42 to translate the magnetic writing head 20 and the magnetic reading head 19 into and out of close proximity of the path of the film. The mechanism is constructed to actuate the mechanism in response to preset conditions or in response to signals provided by the magnetic reading head 19 or sensors 44 and 45. Sensors 44 and 45 are designed to monitor a plurality of parameters including film speed, film location, temperature, frame advancement, and fault conditions such as film breakage, film jam, and heater or magnetic reader or magnetic writer malfunction.

Figure 8:
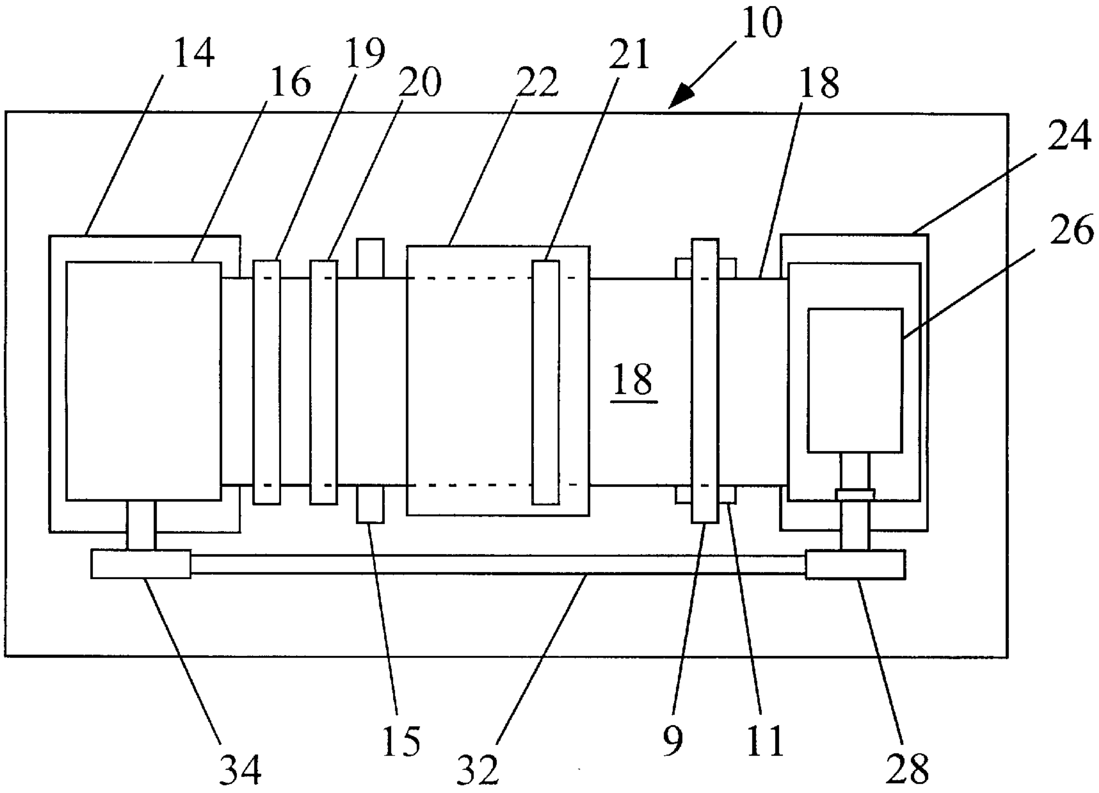
FIG. 8 is an alternative cross-sectional view on line 5—5 of FIG. 1 showing cooling means to preserve magnetic information.

In FIG. 8 the film 18 is shown to pass heater 22 and a chiller 21. Chiller 21 is designed to provide cooling to regions of the film containing magnetic information so that the magnetic information is not degraded by the temperature extremes of the thermal processing conditions.

The heater 22 utilized in the apparatus of the invention may be any suitable type of heater. Heaters for the apparatus include radiant heaters, heated liquid, dielectric, microwave, conduction, and convection. Preferred for the apparatus of the invention is a resistive heater in the form of a plate, as this provides maximum transfer efficiency for heat to the thermally developable film. Other types of resistive heaters also may be utilized such as a series of heater bars or a grid. The resistive heater plate preferred for the invention generally is between about 2 and 5 cm in length for reasonable drive speed of the film with adequate exposure time to the temperature of development.

The thrust cartridge may be any cartridge that allows film to be withdrawn from the cartridge and rewound onto the cartridge multiple times while providing lighttight storage, particularly prior to exposure and development. Typical of such cartridges are those utilized in the advanced photo system (APS) for color negative film. These cartridges are disclosed in U.S. Pat. No. 4,834,306-Robertson et al and U.S. Pat. No. 4,832,275-Robertson.

The thermal film utilized in the invention may be any film that provides satisfactory images. Typical films are full color thermal films such as disclosed in U.S. Pat. No. 5,698,365-Taguchi et al. A typical film provides light sensitive silver halides, compounds that form dyes, compounds that release dyes, couplers as dye donating compounds, reducing agents, and binders on supports. A typical film may also contain organic metal salt oxidizing agents and antifoggants. Other components may be included as known in the photographic and photothermographic art. These components may be added in the same layers or in separate layers over the film base. A wide range of colors may be obtained by using in combination at least three silver halide emulsion layers, each having light sensitivity in different spectral regions. The thermal film can be provided with various supplementary layers such as protective layers, undercoat layers, intermediate layers, antihalation layers, and back layers. The respective layers can be variously disposed as known in the usual color photographic materials. Filter dyes may be included in some layers.

Light sensitive elements or films useful in the practice of this invention are supplied in thrust cartridges or cassettes. Thrust cartridges are disclosed by Kataoka et al U.S. Pat. No. 5,226,613; by Zander U.S. Pat. No. 5,200,777; by Dowling et al U.S. Pat. No. 5,031,852; by Pagano et al U.S. Pat. No. 5,003,334; and by Robertson et al U.S. Pat. No. 4,834,306. These thrust cartridges may be employed in reloadable cameras designed specifically to accept such film cassettes, in cameras fitted with an adapter designed to accept such film cassettes or in one time use cameras desigend to accept such cassettes. Narrow bodied one-time-use cameras suitable for employing thrust cartridges are described by Tobioka et al U.S. Pat. No. 5,692,221. While the film may be mounted in a one-time-use camera in any manner known in the art, it is especially preferred to mount the film in the one-time-use camera such that it is taken up on exposure by a thrust cartridge.

Elements having excellent light sensitivity are best employed in the practice of this invention. The elements should have a sensitivity of at least about ISO 50, preferably have a sensitivity of at least about ISO 200, and more preferably have a sensitivity of at least about ISO 400. Elements having a sensitivity of up to ISO 3200 or even higher are specifically contemplated. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number PH 2.27-1981 (ISO (ASA Speed)) and relates specifically the average of exposure levels required to produce a density of 0.15 above fog in each of the green light sensitive and least sensitive color recording unit of a color film. This definition conforms to the International Standards Organization (ISO) film speed rating. For the purposes of this disclosure, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

The elements useful in this invention comprise at least one incorporated developing agent which may be supplied in a blocked or unblocked form as known in the art. When supplied in a blocked form, the blocked developing agent is unblocked on heating as known in the art. Classes of useful developing agents include aminophenols, paraphenylene diamines and hydrazides all as known in the art. Classes of useful blocked developing agents include sulphonamidophenols, carbonamidophenols, carbamylphenols, sulphonamidoanalines, carbonamidoanalines, carbamylanalines, sulphonylhydrazines, carbonylhydrazines, carbamylhydrazines, and such. Multiple distinct developing agents can be employed. On heating the developing agent reacts with incorporated oxidant to form oxidized developer. The oxidized developer then reacts with a color forming agent to form a non-diffusing dye. In one embodiment, the oxidized developer reacts with a chromogenic coupler to form a non-diffusing dye. In another embodiment the oxidized developer reacts with a leuco-dye to form a non-diffusing dye. In yet another embodiment, the oxidized developer reacts with a color-free dye precursor to liberate a non-diffusing colored dye, all as known in the art. The incorporated oxidant may be any oxidant suitable for reacting with the reduced form of a color developing agent. In one embodiment, the sensitized silver halide may serve as the incorporated oxidant. In a preferred embodiment, a distinct metal salt may serve as the incorporated oxidant. In this latter case, organic silver salts as known in the art are preferred. Silver behenate, silver benzotriazole derivatives, silver acetylide derivatives and silver aminoheterocycle derivatives are specifically preferred classes of incorporated oxidants. The element may also include a pH altering base or base precursor as known in the art. Further, the element may include an auxiliary developer or electron transfer agent as known in the art. Specific useful species are described by Taguchi et al in U.S. Pat. No. 5,698,365 already cited.

A typical color film construction useful in the practice of the invention is illustrated by the following:

Element SCN-1

SOC Surface Overcoat

BU Blue Recording Layer Unit
IL1 First Interlayer
GU Green Recording Layer Unit
IL2 Second Interlayer
RU Red Recording Layer Unit
AHU Antihalation Layer Unit
S Support
SOC Surface Overcoat The support S can be either reflective or transparent, which is usually preferred. When reflective, the support is white and can take the form of any conventional support currently employed in color print elements. When the support is transparent, it can be colorless or tinted and can take the form of any conventional support currently employed in color negative elements, e.g., a colorless or tinted transparent film support so long as it otherwise has the strength and thermal stability properties described above. Details of support construction are well understood in the art. The support is thin enough to enable loading of long lengths in rolled form, while maintaining sufficient strength to resist deformation and tearing during use. The support is generally up to about 180 $\mu$m thick, preferably between 50 and 130 $\mu$m thick, and most preferably between 60 and 110 $\mu$m thick. The support and element flexibility will be such that the element can assume a radius of curvature of less than 12,000 $\mu$m, and preferably less than 6,500 $\mu$m, or even less. Elements useful without cracking or other physical deformity at a radius of curvature of 1,400 $\mu$m or even lower are contemplated. When the element is supplied in cartridge form, the cartridge may enclose a light sensitive photographic element in roll form and a housing for protecting the film element from exposure and an opening for withdrawing the element from the cartridge receptacle. Transparent and reflective support constructions, including subbing layers to enhance adhesion, are disclosed in *Research Disclosure,* Item 38957, cited above, XV. Supports.

Each of blue, green, and red recording layer units BU, GU and RU is formed of one or more hydrophilic colloid layers and contains at least one radiation-sensitive silver halide emulsion and a color forming agent, including at least one dye image-forming agent. In the simplest contemplated construction each of the layer units consists of a single hydrophilic colloid layer containing emulsion and a color forming agent. When the a color forming agent present in a layer unit is coated in a hydrophilic colloid layer other than an emulsion containing layer, the color forming agent containing hydrophilic colloid layer is positioned to receive oxidized color developing agent from the emulsion during development. Usually the a color forming agent containing layer is the next adjacent hydrophilic colloid layer to the emulsion containing layer.

In order to ensure excellent image sharpness, and to facilitate manufacture and use in cameras, all of the sensitized layers are preferably positioned on a common face of the support. When in spool form, the element will be spooled such that when unspooled in a camera, exposing light strikes all of the sensitized layers before striking the face of the support carrying these layers. Further, to ensure excellent sharpness of images exposed onto the element, the total thickness of the layer units above the support should be controlled. Generally, the total thickness of the sensitized layers, interlayers and protective layers on the exposure face of the support are less than 35 $\mu$m. It is preferred that the total layer thickness be less than 28 $\mu$m, more preferred that the total layer thickness be less than 22 $\mu$m, and most preferred that the total layer thickness be less than 17 $\mu$m. This constraint on total layer thickness is enabled by controlling the total quantity light sensitive silver halide as described below, and by controlling the total quantity of vehicle and other components, such as a color forming agents, solvent, and such in the layers. The total quantity of vehicle is generally less than 20 g/m$^2$, preferably less than 14 g/m$^2$, and more preferably less than 10 g/m$^2$. Generally, at least 3 g/m$^2$ of vehicle, and preferably at least 5 g/m$^2$ of vehicle is present so as to ensure adhesion of the layers to the support during processing and proper isolation of the layer components. Likewise, the total quantity of other components is generally less than 12 g/m$^2$, preferably less than 8 g/m$^2$, and more preferably less than 5 g/m$^2$.

In another embodiment, the color forming layers may be applied to both sides of a support to form a duplitized film suitable for use in a camera all as described by Szajewski et al U.S. Pat. Nos. 5,744,290 and 5,773,205.

The emulsion in BU is capable of forming a latent image when exposed to blue light. When the emulsion contains high bromide silver halide grains and particularly when minor (0.5 to 20, preferably 1 to 10, mole percent, based on silver) amounts of iodide are also present in the radiation-sensitive grains, the native sensitivity of the grains can be relied upon for absorption of blue light. Preferably the emulsion is spectrally sensitized with one or more blue spectral sensitizing dyes. The emulsions in GU and RU are spectrally sensitized with green and red spectral sensitizing dyes, respectively, in all instances, since silver halide emulsions have no native sensitivity to green and/or red (minus blue) light. Blue-green and green-red sensitive emulsions may also be employed as known in the art. In this context, Blue light is light generally having a wavelength between 400 and 500 nm, Green light is light generally having a wavelength between 500 and 600 nm and Red light is light generally having a wavelength between 600 and 700 nm.

Any convenient selection from among conventional radiation-sensitive silver halide emulsions can be incorporated within the layer units. Radiation-sensitive silver chloride, silver bromide, silver iodobromide, silver iodochloride, silver chlorobromide, silver bromochloride, silver iodochlorobromide, and silver iodobromochloride grains may be employed. The grains can be either regular or irregular (e.g., tabular). Tabular grain emulsions, those in which tabular grains account for at least 50 (preferably at least 70 and optimally at least 90) percent of total grain projected area are particularly advantageous for increasing speed in relation to granularity. To be considered tabular a grain requires two major parallel faces with a ratio of its equivalent circular diameter (ECD) to its thickness of at least 2. Specifically preferred tabular grain emulsions are those having a tabular grain average aspect ratio of at least 4 and, optimally, greater than 8. Preferred mean tabular grain thicknesses are less than 0.3 $\mu$m (most preferably less than 0.2 $\mu$m). Ultrathin tabular grain emulsions, those with mean tabular grain thicknesses of less than 0.07 $\mu$m, are specifically preferred. The grains preferably form surface latent images so that they produce negative images when processed in a surface developer. While any useful quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements. These lower quantities of silver are additionally important in that they enable rapid development and desilvering of the elements. Conversely, a silver coating coverage of at least 2 g of coated silver per $m^2$of support surface area in the element is necessary to realize an exposure latitude of at least 2.7 log E while maintaining an adequately low graininess position for pictures intended to be enlarged. The green light recording layer unit is preferred to have a coated silver coverage of at least 0.8 $g/m^2$. It is more preferred that the red and green units together have at least 1.7 $g/m^2$ of coated silver and even more preferred that each of the red, green, and blue color units has at least 0.8 $g/m^2$ of coated silver. Because of its less favored location for processing, it is generally preferred that the layer unit located, on average, closest to the support contain a silver coating coverage of at least 1.0 $g/m^2$ of coated silver. Typically, this is the red recording layer unit. For many photographic applications, optimum silver coverages are at least 0.9 g/m in the blue recording layer unit and at least 1.5 $g/m^2$ in the green and red recording layer units.

Illustrations of conventional radiation-sensitive silver halide emulsions are provided by *Research Disclosure,* Item 38957, cited above, Section I. Emulsion grains and their preparation. Chemical sensitization of the emulsions, which can take any conventional form, is illustrated in Section IV. Chemical sensitization. Spectral sensitization and sensitizing dyes, which can take any conventional form, are illustrated by Section V. Spectral sensitization and desensitization. The emulsion layers also typically include one or more antifoggants or stabilizers, which can take any conventional form, as illustrated by Section VII. Antifoggants and stabilizers.

BU contains at least one yellow dye image-forming agent, GU contains at least one magenta dye image-forming agent, and RU contains at least one cyan dye image-forming agent. Any convenient combination of conventional dye image-forming agents can be employed. Magenta dye-forming pyrazoloazole agents are particularly contemplated. Conventional dye image-forming agents are illustrated by *Research Disclosure,* Item 38957, cited above, X. Dye image formers and modifiers, B. Image-dye-forming couplers.

The remaining elements SOC, IL1, IL2, and AHU of the element SCN-1 are optional and can take any convenient conventional form.

The interlayers IL1 and IL2 are hydrophilic colloid layers having as their primary function color contamination reduction, i.e., prevention of oxidized developing agent from migrating to an adjacent recording layer unit before reacting with dye-forming agent. The interlayers are, in part, effective simply by increasing the diffusion path length that oxidized developing agent must travel. To increase the effectiveness of the interlayers to intercept oxidized developing agent, it is conventional practice to incorporate an oxidized developing agent scavenger. When one or more silver halide emulsions in GU and RU are high bromide emulsions and, hence, have significant native sensitivity to blue light, it is preferred to incorporate a yellow filter, such as Carey Lea silver or a yellow processing solution decolorizable dye, in IL1. Suitable yellow filter dyes can be selected from among those illustrated by Research Disclosure, Item 38957, VIII. Absorbing and scattering materials, B. Absorbing materials. Antistain agents (oxidized developing agent scavengers) can be selected from among those disclosed by *Research Disclosure,* Item 38957, X. Dye image formers and modifiers, D. Hue modifiers/stabilization, paragraph (2).

The antihalation layer unit AHU typically contains a removable or decolorizable light absorbing material, such as one or a combination of pigments and dyes. Suitable materials can be selected from among those disclosed in *Research Disclosure,* Item 38957, VIII. Absorbing materials. A common alternative location for AHU is between the support S and the recording layer unit coated nearest the support.

The surface overcoats SOC are hydrophilic colloid layers that are provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research Disclosure,* Item 38957, IX. Coating physical property modifying addenda. The SOC overlying the emulsion layers additionally preferably contains an ultraviolet absorber, such as illustrated by *Research Disclosure,* Item 38957, VI. UV dyes/optical brighteners/luminescent dyes, paragraph (1).

Instead of the layer unit sequence of element SCN-1, alternative layer units sequences can be employed and are particularly attractive for some emulsion choices. Using high chloride emulsions and/or thin (<0.2 $\mu$m mean grain thickness) tabular grain emulsions, all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers.

It is preferred to coat one, two, or three separate emulsion layers within a single dye image forming layer unit so as to obtain the requisite exposure latitude. When two or more emulsion layers are coated in a single layer unit, they are typically chosen to differ in sensitivity. When a more sensitive emulsion is coated over a less sensitive emulsion, a higher speed and longer latitude is realized than when the two emulsions are blended. When a less sensitive emulsion is coated over a more sensitive emulsion, a higher contrast is realized than when the two emulsions are blended. Triple coating, incorporating three separate emulsion layers within a layer unit, is a technique for facilitating extended exposure latitude, as illustrated by Chang et al U.S. Pat. Nos. 5,314,793 and 5,360,703.

When a layer unit is comprised of two or more emulsion layers, the units can be divided into sub-units, each containing emulsion and a color forming agent, that is interleaved with sub-units of one or both other layer units. The following elements are illustrative:

Element SCN-2
SOC Surface Overcoat
BU Blue Recording Layer Unit
IL1 First Interlayer
FGU Fast Green Recording Layer Sub-Unit
IL2 Second Interlayer
FRU Fast Red Recording Layer Sub-Unit
IL3 Third Interlayer
SGU Slow Green Recording Layer Sub-Unit
IL4 Fourth Interlayer
SRU Slow Red Recording Layer Sub-Unit
S Support AHU Antihalation Layer Unit
SOC Surface Overcoat Except for the division of the green recording layer unit into fast and slow sub-units FGU and SGU and the red recording layer unit into fast and slow sub-units FRU and SRU, the constructions and construction alternatives are essentially similar to those previously described from element SCN-1. The placement of AHU relative to S and the sensitized layers can vary depending on the decolorizing characteristics of the density forming components incorporated in AHU and on the intended use of the element, all as known in the art. Elements employing multiple AHU layers positioned on both faces of S are specifically contemplated.

Element SCN-3
SOC Surface Overcoat
FBU Fast Blue Recording Layer Unit
IL1 First Interlayer
FGU Fast Green Recording Layer Sub-Unit
IL2 Second Interlayer
FRU Fast Red Recording Layer Sub-Unit
IL3 Third Interlayer
MBU Mid Blue Recording Layer Unit
IL4 Fourth Interlayer
MGU Mid Green Recording Layer Sub-Unit
IL5 Fifth Interlayer
MRU Mid Red Recording Layer Sub-Unit
IL6 Sixth Interlayer
SBU Slow Blue Recording Layer Sub-Unit
IL7 Seventh Interlayer
SGU Slow Green Recording Layer Sub-Unit
IL8 Eighth Interlayer
SRU Slow Red Recording Layer Sub-Unit
AHU Antihalation Layer Unit
S Support
SOC Surface Overcoat Except for the division of the blue, green, and recording layer units into fast, mid, and slow sub-units, the constructions and construction alternatives are essentially similar to those previously described from element SCN-1.

The following layer order arrangement is also especially useful:

Element SCN-4
SOC Surface Overcoat
FBU Fast Blue Recording Layer Unit
MBU Mid Blue Recording Layer Unit
SBU Slow Blue Recording Layer Sub-Unit
IL1 First Interlayer
FGU Fast Green Recording Layer Sub-Unit
MGU Mid Green Recording Layer Sub-Unit
SGU Slow Green Recording Layer Sub-Unit
IL2 Second Interlayer
FRU Fast Red Recording Layer Sub-Unit
MRU Mid Red Recording Layer Sub-Unit
SRU Slow Red Recording Layer Sub-Unit
IL3 Third Interlayer
AHU Antihalation Layer Unit
S Support
SOC Surface Overcoat Except for the division of the blue, green, and recording layer units into fast, mid, and slow sub-units, the constructions and construction alternatives are essentially similar to those previously described from element SCN-1.

When the emulsion layers within a dye image-forming layer unit differ in speed, it is conventional practice to limit the incorporation of dye image-forming agent in the layer of highest speed to less than a stoichiometric amount, based on silver. The function of the highest speed emulsion layer is to create the portion of the characteristic curve just above the minimum density, i.e., in an exposure region that is below the threshold sensitivity of the remaining emulsion layer or layers in the layer unit. In this way, adding the increased granularity of the highest sensitivity speed emulsion layer to the dye image record produced is minimized without sacrificing imaging speed. Other details of film and camera characteristics that are especially useful in the present invention are described by Nozawa at U.S. Pat. No. 5,422,231 and by Sowinski et al at U.S. Pat. No. 5,466,560.

In the foregoing discussion the blue, green, and red recording layer units are described as containing yellow, magenta, and cyan image dye-forming agents, respectively, as is conventional practice in color negative elements used for printing. In the color negative elements of the invention, which are intended for scanning to produce three separate electronic color records, the actual hue of the image dye produced is of no importance. What is essential is merely that the dye image produced in each of the layer units be differentiable from that produced by each of the remaining layer units. To provide this capability of differentiation, it is contemplated that each of the layer units contains one or more dye image-forming agents chosen to produce image dye having an absorption half-peak bandwidth lying in a different spectral region. It is immaterial whether the blue, green, or red recording layer unit forms a yellow, magenta, or cyan dye having an absorption half peak bandwidth in the blue, green, or red region of the spectrum, as is conventional in a color negative element intended for use in printing, or an absorption half peak bandwidth in any other convenient region of the spectrum, ranging from the near ultraviolet (300–400 nm) through the visible and through the near infrared (700–1200 nm), so long as the absorption half peak bandwidths of the image dye in the layer units extend non-coextensive wavelength ranges. Preferably each image dye exhibits an absorption half-peak bandwidth that extends over at least a 25 (most preferably 50) nm spectral region that is not occupied by an absorption half-peak bandwidth of another image dye. Ideally the image dyes exhibit absorption half-peak bandwidths that are mutually exclusive.

When a layer unit contains two or more emulsion layers differing in speed, it is possible to lower image granularity in the image to be viewed, recreated from an electronic record, by forming in each emulsion layer of the layer unit a dye image which exhibits an absorption half peak bandwidth that lies in a different spectral region than the dye images of the other emulsion layers of the layer unit. This technique is particularly well suited to elements in which the layer units are divided into sub-units that differ in speed. This allows multiple electronic records to be created for each layer unit, corresponding to the differing dye images formed by the emulsion layers of the same spectral sensitivity. The digital record formed by scanning the dye image formed by an emulsion layer of the highest speed is used to recreate the portion of the dye image to be viewed lying just above minimum density. At higher exposure levels second and, optionally, third electronic records can be formed by scanning spectrally differentiated dye images formed by the remaining emulsion layer or layers. These digital records contain less noise (lower granularity) and can be used in recreating the image to be viewed over exposure ranges above the threshold exposure level of the slower emulsion layers. This technique for lowering granularity is disclosed in greater detail by Sutton U.S. Pat. Nos. 5,314,794 and 5,389,506.

Each layer unit of the color negative elements of the invention produces a dye image characteristic curve gamma of less than 1.5, which facilitates obtaining an exposure latitude of at least 2.7 log E. A minimum acceptable exposure latitude of a multicolor photographic element is that which allows accurately recording the most extreme whites (e.g., a bride's wedding gown) and the most extreme blacks (e.g., a bridegroom's tuxedo) that are likely to arise in photographic use. An exposure latitude of 2.6 log E can just accommodate the typical bride and groom wedding scene. Accordingly, the elements useful in the practice of this invention exhibit an exposure latitude of at least 2.7 log E. An exposure latitude of at least 3.0 log E is preferred, since this allows for a comfortable margin of error in exposure level selection by a photographer. Even larger exposure latitudes of 3.6 log E are especially preferred for elements preloaded in one-time-use cameras, since the ability to obtain accurate image reproduction with rudimentary exposure control is realized. Whereas in color negative elements intended for printing, the visual attractiveness of the printed scene is often lost when gamma is exceptionally low, when color negative elements are scanned to create electronic image-bearing signals from the dye image records, contrast can be increased by adjustment of the electronic signal information. When the elements of the invention are scanned using a reflected beam, the beam travels through the layer units twice. This effectively doubles gamma ($\Delta D/\Delta \log E$) by doubling changes in density $\Delta D$). Thus, gammas as low as 0.5 or even 0.2 or lower are contemplated and exposure latitudes of up to about 5.0 log E or higher are feasible.

It is appreciated that while the element has been described in detail as a color negative element, similar considerations apply to positive working elements so long as they fulfill the latitude, gamma, masking a color forming agent, and gamma ratio requirements already described. In a concrete example, the element can be made positive working by employing direct reversal emulsions as known in the art. It is further appreciated that known color reversal elements fail the latitude, gamma, and gamma ratio requirements set out herein since these requirements are physically incompatible with the image gammas required for direct viewing and with the concomitant latitudes available from dye images.

A suitable thermal film renders an image in response to an imagewise exposure to light upon thermal development. Typical thermal processing conditions involve development temperatures of about 50 to 180° C. for a period of 0.1 to 60 seconds. The film base may be any suitable kind of film base that does not substantially decompose under the processing conditions. Polyethyleneterephthalate (PET), polyethylenenaphthalate (PEN), and annealed PEN (APEN) are examples of suitable materials for the film base The accumulator for the film in the apparatus of the invention may be any suitable kind of device. Generally, it is preferred that the drive means for the accumulator also drives the cartridge to thrust the film from the cartridge and rewind it into the cartridge. However, separate drive means to thrust the film in and out of the cartridge and to drive the accumulator may also be provided. For compact design, it has been found that having the drive motor within the accumulator itself provides efficiency and compactness. While this is a preferred embodiment, it is not necessary to adequate function of the apparatus, and the drive motor or drive motors may be placed in any position suitable for actuating the thrust cartridge and accumulator to effect transport of the film. The drive motor may be any suitable type of drive motor. Drive motors include AC, DC, and stepper electric motors. Preferred for the apparatus of the invention is a DC electric motor, as this provides a simple means of controlling drive speed. While DC electric motors are preferred in some embodiments, other types of motors or combinations of motors may be used to effect suitable means of driving the film.

The apparatus is provided with means for controlling the speed of the film over the heater. It is also provided with means for determining and controlling the temperature of the heater. It is important for the best photographic performance that the heater be accurately controlled for optimum development temperature. The drive speed, in combination with the heater temperature, provides accurate control of the development process. The heater will be provided with a temperature sensor to determine the instantaneous temperature of the heater. The temperature sensor may be a thermocouple or any other suitable device. Power is supplied to the heater in proportion to a temperature deficiency detected by the temperature sensor. The temperature control circuit uses feedback to maintain and control the temperature of the heater and thereby control the development temperature. The speed of the film over the heater may be controlled by any suitable means of speed control. Pulse width modulation applied to a DC motor that drives both the thrust cartridge and accumulator or timed steps applied to a stepper motor that drives both the thrust cartridge and accumulator are examples of suitable speed control. The motor that drives both the thrust cartridge and the accumulator may be placed within the accumulator for compactness. While this is a preferred embodiment, the drive means may comprise one motor or any combination of motors located in suitable positions within the apparatus of the invention. The film speed is controlled to provide sufficient residence time for the film near the heater and to provide optimal development. The apparatus of the g invention typically requires an exposure to the heater for about 2 to 30 seconds to develop a frame of film.

It may be desirable to provide a means to prevent contact of the film with the heater at certain times. For instance, if the device is stopped while film is on the heater, the film could be damaged or improperly developed. To prevent this, the heater could be removed from the film path or the device could be provided with a means to change the film path to be away from the heater. A method for removing the heater from the film path uses an armature connected to a series of gears that are driven by a motor. The motor is controlled to drive the heater away or toward the film path as desired. The motor may be any suitable type of drive motor. Preferred motor for the apparatus of the invention is a stepper electric motor, as this provides a simple means to control the motion of the heater. For compact design, it has been found that having the motor actuating the heater within the accumulator provides efficiency and compactness. While this is a preferred embodiment, it is not necessary to adequate function of the apparatus, and the motor actuating the heater may be placed in any position suitable for moving the heater in close proximity to and removing the heater from the film path.

The motor actuating the heater may be controlled by preset conditions, or it may be constructed to respond to signals provided by sensors monitoring the film and/or development. Sensors may be mounted in the film path to monitor a plurality of parameters including film speed, film location, temperature, frame advancement, and fault conditions such as film breakage, film jam, and heater malfunction. Light emitting diode (LED) sensors are preferred for detection of the position of the image frames in the thermal film. While LED sensors are preferred for the detection of image frame position, the sensors utilized in the apparatus of the invention may be of any suitable type to monitor the parameters of interest. Sensors for the apparatus include optical, magnetic, mechanical, and electronic sensors. The response of such sensors is transmitted to the drive mechanism actuating the heater to place the heater in close proximity to or remove the heater from the film path as desired. In another embodiment, actuated guide rollers are used to lift the film away from the heater when contact between the film and the heater is not desired. The film may also be protected from undue heating by a heater that is sufficiently low in thermal mass and fast in response time to allow the temperature of the heater to be reduced below the damage threshold of the film when necessary.

The apparatus of the invention includes a means for optical scanning. The optical scanner provides an electronic representation of film image information or other information optically encoded on the film. The utility of such an electronic record is widely known in the art. For example, the electronic record of the film image information may be digitized and further processed using various algorithms and communicated to a printing device to yield high quality output prints without requiring optical printing. Typical application of the optical scanner involves scanning thermally processed regions of said thermal film. However, optical scanning may be performed either before or after thermal film has been entirely thermally processed. For example, a test patch of film may be thermally processed and optically scanned and the resulting optical density information may be used to modify subsequent processing conditions. If optical scanning is performed while regions of the film remain unprocessed, care must be taken to ensure that the light source of said scanner does not further expose unprocessed regions of the thermal film. After thermal processing and optical scanning, the film may be rewound back into the thrust cartridge for convenient storage.

The optical scanner may be any suitable type of optical scanner. Preferred for the apparatus of the invention are scanners that faithfully create an electronic record of the film image information. Typical of suitable optical scanners are optical scanners such as disclosed in U.S. Pat. No. 5,684, 610-Brandestini et al. Optical transmission scanners are preferred as they provide high spatial resolution scanning with sufficient detection fidelity. The apparatus of the invention may be provided with a means to process, modify, store, and retrieve the electronic record of the film image data produced by the optical scanner. The apparatus of the invention may also be provided with a means to process, store, and retrieve the electronic record of the optical scanning parameters associated with the optical scanning of the film. The apparatus of the invention may be provided with a means to communicate the electronic record of the film image data and/or scanning parameters to other hardware devices including displays, computer systems, and printers and to other electronic communication networks. Optical information may also be recorded on the thermally developable film to be read by the optical scanner and used to control thermal processing conditions or magnetic reading or magnetic writing.

The light source for the optical scanner may be any suitable type. Light sources include incandescent bulbs, fluorescent lamps, and light emitting diodes (LEDs). Preferred for the apparatus of the invention are LED light sources as LED light sources are efficient and compact. In one embodiment of the invention three distinct LED sources, each one emitting different wavelengths, are utilized as the light source. For example, blue, green, and red emitting LEDs may be combined to produce effectively white light to be used as the illuminant. While this is a particular embodiment, other suitable light sources may be used to effect faithful scanning of the film image information. The light source is provided with controls so that it may be activated and deactivated as appropriate to perform effective optical scanning without interfering with other functions of the invention.

A mirror or mirror system may be provided as part of the optical scanner to redirect the transmitted light. A preferred embodiment of the invention provides a mirror to direct the transmitted light beam to be roughly parallel to the film path for efficiency and compactness. Any suitable and appropriately reflective device may serve as a mirror. Silver coated polished aluminum mirrors are preferred for the apparatus of the invention as silver coated polished aluminum mirrors are robust, low-cost, and appropriately reflective. While silver coated polished aluminum mirrors represent a preferred embodiment, any suitably reflective surface may be used as a mirror in the apparatus of the invention. The mirror may be planar or curved. A non-planar mirror may be used to focus or otherwise modify the beam of transmitted light to improve scanner system performance.

The apparatus of the invention may be provided with a lens or lens system to modify the transmitted light beam. The lens or lens system may be comprised of spherical or non spherical lenses. Spectral filters may be provided in the light path to modify the spectral distribution of the incident or transmitted light beam. One embodiment of the invention incorporates liquid-crystal light modulators and/or spectral filters that may be electronically activated and/or mechanically actuated to modify and control the intensity and spectral distribution of the incident and transmitted light. An advantage of this embodiment is that it does not require a color sensitive photoelectronic detector. While this represents one embodiment, the apparatus of the invention does not require liquid-crystal light modulators or mechanically actuated spectral filters. To enhance fidelity and increase efficiency, all optical interfaces may be anti-reflection coated as is known in the art.

The photosensitive detector may be any suitable type of device capable of faithfully producing an electronic signal in response to incident light. Solid-state detectors and photomultiplier tubes are examples of suitable photosensitive elements. Preferred for the apparatus of the invention are solid state detectors. Charge coupled devices (CCD) or complementary metal oxide semiconductors (CMOS) are particular examples of suitable solid-state photoelectronic detectors. The detectors may be combined in a linear array so that stripes of the film corresponding to the length of the linear array are scanned simultaneously. One embodiment of the invention utilizes a tri-linear array of photosensitive cells where each linear array is sensitive to incident radiation of a different spectral distribution. For example, if a white light source is used, the transmitted light intensity data from red, green, and blue sensitive linear photodetector arrays can be processed to yield a full color electronic file representation of the film image information. While tri-linear array detectors are preferred, other suitable types of detectors may be used. For example, two-dimensional array detectors may be utilized to simultaneously scan larger areas of the film than tri-linear arrays. This would allow faster film feed rates and provide for more rapid scanning. Large two-dimensional array detectors may be used to simultaneously scan an entire film image frame.

The apparatus may be provided with controls for the optical scanner. The capability to perform optical scanning in response to information stored electronically, magnetically, or optically on the thermally developable film or the thrust cartridge or information provided by some other source is important to achieve optimal optical scanning. Parameters such as desired resolution, film type, and expected optical density range may be communicated to the optical scanner so that the scanning parameters may be altered to produce advantaged optical scans and prevent interference between optical scanning and other functions of the invention such as thermal processing or magnetic information reading or writing.

If a magnetic reader is utilized, it may be any suitable type of magnetic reader. Preferred for the apparatus of the invention are inductive type laminated mu-metal core with coil magnetic readers, as such magnetic readers provide a low-cost and robust means to read magnetic information stored on film, while minimizing noise and controlling crosstalk. The magnetic reader may be located anywhere in the film path. Locating the magnetic reader so that the magnetic information is read before the film is thermally processed is preferred, as this allows the processing conditions to be controlled in response to the magnetic information and avoids potential degradation of the magnetic information associated with the thermal processing. Multiple magnetic readers may be included so that magnetic information is read at a variety of locations in the film path. The apparatus of the invention also contains means to store, transmit, and record electronic information. Specifically the apparatus of the invention preferably contains means to store, transmit, and process the electronic record of the magnetic information sensed by the magnetic reader. This electronic record may be used to control or modify subsequent processes such as thermal processing, optical printing, or optical scanning. The capability to perform subsequent processing in response to information stored magnetically on the film is important to optimal imaging system performance. For example, since different thermal film formulations generally require different thermal processing conditions to achieve optimal development, controlling the heater and film drive speed in response to film type information that may be stored magnetically on the film is important to achieve optimal development and subsequent image quality.

The magnetic writer, if present, may be any suitable type of magnetic writer. Preferred for the apparatus of the invention are inductive type laminated mu-metal core with coil magnetic writers, as such magnetic writers provide a low-cost and robust means to write magnetic information onto film. The magnetic writer may be located anywhere in the film path. Locating the magnetic writer so that the magnetic information is written after the film is thermally processed is preferred as this avoids potential degradation of the magnetic information associated with the thermal processing. Multiple magnetic writers may be included so that magnetic information is written at a variety of locations in the film path. The magnetic writer can write any type of information that may be encoded magnetically. Specifically the magnetic writer may rewrite data previously stored on the film or film cartridge or the magnetic writer may write new information onto the film such as the processing conditions or the date of processing. Such information is used to optimize subsequent processing. For example, advantaged optical scanning results from adjusting optical scanning parameters to provide for expected density values based on the processing conditions.

A preferred embodiment of the apparatus of the invention requires magnetic information to be written onto the film in positions that are known relative to other elements on the film such as imaging frames. A preferred means of determining the image frame position comprises light emitting diode (LED) sensors and perforations in the film spaced at regular intervals relative to the imaging frames. Writing the magnetic information onto regions of the film in registry with the imaging frames allows frame specific information to be more accurately and immediately applied to individual frames resulting in improved system efficiency.

The magnetic writer may be combined with the magnetic reader into a single assembly or they may be separate. The magnetic reader and the magnetic writer may be mounted together or separately on one or more armatures which may be actuated to remove the magnetic reader or the magnetic writer from the film path. The motor actuating an armature may be controlled by preset conditions, or it may be constructed to respond to signals provided by sensors monitoring the film and/or development. Sensors may be mounted in the film path to monitor a plurality of parameters including film speed, film location, temperature, frame advancement, and fault conditions such as film breakage, film jam, and heater malfunction. The armature mechanism may be constructed so that the magnetic reader and the magnetic writer are actuated simultaneously or independently. Retraction of the magnetic reader and/or the magnetic writer is of utility to avoid unwanted interference with other processing steps such as thermal development or optical scanning. Specifically, contact between the magnetic reader and/or the magnetic writer and the thermal film may prevent the film from optimally engaging the heater or optical scanner. Removing the magnetic reader and/or the magnetic writer from the film path avoids such detrimental interference. The armature mechanism may be constructed to return the magnetic reader or magnetic writer to the film path after the magnetic reader or magnetic writer has been removed from the film path.

The apparatus of the invention may be provided with a means to erase any magnetic information stored on the film. The device used to erase the magnetic information may be any suitable type of device. The magnetic eraser may be located anywhere in the film path. Locating the magnetic eraser so that the magnetic information is erased after the film is thermally processed but before magnetic information is rewritten onto the film is preferred, as this allows potentially degraded magnetic information to be discarded and further allows for more effective writing of magnetic information by the magnetic writer. The magnetic eraser may also allow the magnetic writer to write magnetic information in a more efficient or useful format than originally present on the film.

The apparatus of the invention may be provided with a means to preserve the magnetic information through the thermal processing conditions. The magnetic information may be preserved through the thermal processing conditions by insulating regions of the film containing the magnetic information from the temperature extremes of the thermal process. This may be accomplished by providing power to the heater only when the regions of the film containing magnetic information are in positions so as not to be overly subject to the temperature extremes of thermal development. Magnetic information stored on the film may also be substantially preserved if the regions of the film containing magnetic information are cooled while other regions of the film are exposed to thermal development. The device used to cool the magnetic regions of the film may be any suitable type of device. Preferred for the apparatus of the invention are thermoelectric coolers as thermoelectric coolers provide for compact and localized cooling without requiring a working fluid or compressor.

The leader for the thermal film should maintain its dimensional stability during processing of the film. The film will misfeed or jam in the film path if the leader exhibits excessive curl, warp, or twist, or expands or contracts excessively under the conditions of the thermal processing. The leader is critical to the repeated use of the developed film in the thrust cartridge. A degraded or unsuitable leader prevents the film from smoothly traversing the film path and results in excessive wear of the film including scratching of the image elements. Repeated use of a thrust cartridge containing film with an unsuitable leader will also cause the thrust cartridge to fail so that the film can no longer be thrust from or rewound into the thrust cartridge. To avoid these problems, the leader may either be protected from the heat extremes of development or be formed of a material that is dimensionally stable at the temperatures of development of up to 180° C. The leader is protected from the heat extremes of development by removing the heater element from the film path until the leader has passed and is no longer in close proximity to the heater. The heater is then placed back into the film path as necessary to process the imaging frames. Suitable actuation of the heater may be provided by a variety of electromotive sub assemblies. In another embodiment, power is supplied to the heater only if the leader is not in close proximity to the heater, thereby insulating the leader from the heat extremes of thermal development. Insulating the leader from the heating element is not required if the leader is comprised of a material that maintains sufficient dimensional stability through the process conditions. To prevent unwanted distortion of the image, the film base need also remain stable through the processing conditions. The typical developing temperatures for color thermal film are likely to be between 50 and 180° C. Therefore, any suitable material that maintains sufficient dimensional stability through these process conditions could be used as the leader or film base material. Polyethyleneterephthalate (PET) is found to be sufficiently stable to be used as a leader and film base, provided the exposure to the highest temperature processing conditions is not excessive.

The device may be of any size that is adequate to house the cartridge, heater, and drive mechanisms. It is preferred that the invention apparatus be made as compact as possible. It is considered desirable that the apparatus be of such a size that it may be fit into a drive bay of a computer. Typically, the lighttight container of the apparatus of the invention would have a volume of less than 1200 $cm^3$.

The power for the apparatus of the invention may be any suitable source. It may be provided with a means to be plugged into a standard electrical outlet. If the device is installed in a computer or as a computer peripheral device, it could draw power from the computer. The apparatus of the invention does not require many of the resources necessary to traditional wet-process photofinishing. It, therefore, allows more convenient photofinishing than traditional wet-processes. It is contemplated that the apparatus of the invention will find application in more widely dispersed settings, such as home or small office use, than traditional wet-process photofinishing. It is further contemplated that the device of the invention will allow photofinishing in remote locations lacking resources, such as contaminant free water and means to treat contaminated effluent, necessary for traditional wet processing. A battery could be utilized as the power source in a remote location for rapid and convenient processing of exposed film.

The following examples illustrate the practice of this invention. They are not intended to be exhaustive of all possible variations of the invention. Parts and percentages are by weight unless otherwise indicated.

EXAMPLES

Example 1

A full color heat developable film is prepared.

Light-Sensitive Silver Halide Emulsion (1) [for Red Sensitive Emulsion Layer].

Solution (1) and solution (2) shown in Table 1 are concurrently added to a well-stirred aqueous solution of gelatin (a solution of 16 g of gelatin, 0.24g of potassium bromide, 1.6 g of sodium chloride, and 24 mg of compound (a) in 540 ml of water heated at 55° C.) at the same flow rate for 19 minutes. After 5 minutes, solution (3) and solution (4) shown in Table 1 are further concurrently added thereto at the same flow rate for 24 minutes. After washing and salt removal by a conventional method, 17.6 g of lime-treated ossein gelatin and 56 mg of compound (b) are added to adjust the pH and the pAg to 6.2 and 7.7, respectively. Then, 1.02 mg of trimethylthiourea are added, followed by optimum chemical sensitization at 60° C. Thereafter, 0.18 g of 4-hydroxy-6-methyl-1,3,3a,7-tetraazainedene, 64 mg of sensitizing dye (C) and 0.41 g of potassium bromide are in turn added, followed by cooling. Thus, 590 g of a monodisperse cubic silver chlorobromide emulsion having a mean grain size of 0.30 μm is obtained,

TABLE 1

| | Solution (1) | Solution (2) | Solution (3) | Solution (4) |
|---|---|---|---|---|
| $AgNO_3$ | 24.0 g | — | 56.0 g | — |
| $NH_4NO_3$ | 50.0 mg | — | 50.0 mg | — |
| KBr | — | 10.9 g | — | 35.3 g |
| NaCl | — | 2.88 g | — | 1.92 g |
| $K_2IrCl_6$ | — | 0.07 mg | — | — |
| Amount Completed | Water to make 130 ml | Water to make 200 ml | Water to make 130 ml | Water to make 200 ml |

Compound (a)

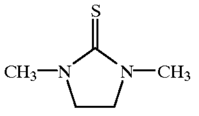

Compound (b)

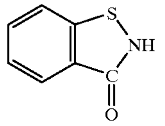

Dye (C)

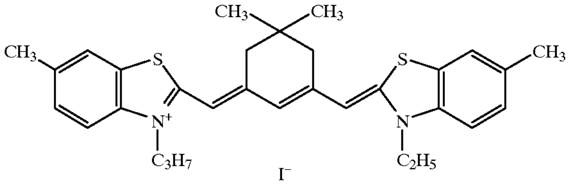

Light-Sensitive Silver Halide Emulsion (2) [for Green Sensitive Emulsion Layer].

Solution (1) and solution (2) shown in Table 2 are concurrently added to a well-stirred aqueous solution of 5% gelatin (a solution of 20 g of gelatin, 0.30 g of potassium bromide, 2.0 g of sodium chloride, and 30 mg of compound (a) in 600 ml of water heated at 46° C.) at the same flow rate for 10 minutes. After 5 minutes, solution (3) and solution(4) shown in Table 2 are further concurrently added thereto at the same flow rate for 30 minutes. One minute after termination of addition of solutions (3) and (4), 600 ml of a solution of sensitizing dyes in methanol containing 360 mg of sensitizing dye ($d_1$) and 73.4 mg of sensitizing dye ($d_2$) is added. After washing and salt removal (conducted using sedimenting agent (e) at pH 4.0) by a conventional method, 22 g of lime-treated ossein gelatin is added to adjust the pH and pAg to 6.0 and 7.6, respectively. Then 1.8 mg of sodium thiosulfate and 180 mg of 4-hydroxy-6-methyl-1,3,3a,7-tetraazainedene are added, followed by optimum chemical sensitization at 60° C. Thereafter, 90 mg of antifoggant (f) and 70 mg of compound (b) and 3 ml of compound (g) as preservatives are added, followed by cooling. Thus, 635 g of a monodisperse cubic silver chlorobromide emulsion having a mean grain size of 0.30 μm is obtained.

TABLE 2

| | Solution (1) | Solution (2) | Solution (3) | Solution (4) |
|---|---|---|---|---|
| $AgNO_3$ | 10.0 g | — | 90.0 g | — |
| $NH_4NO_3$ | 60.0 mg | — | 380 mg | — |
| KBr | — | 3.50 g | — | 57.1 g |
| NaCl | — | 1.72 g | — | 3.13 g |
| $K_2IrCl_6$ | — | — | — | 0.03 mg |
| Amount Completed | Water to make 126 ml | Water to make 131 ml | Water to make 280 ml | Water to make 289 ml |

Dye ($d_1$)

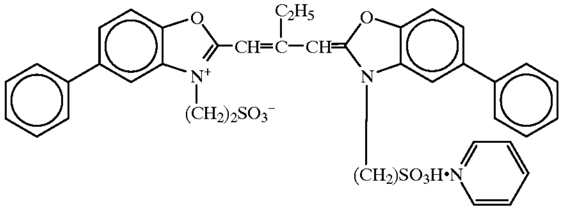

Dye ($d_2$)

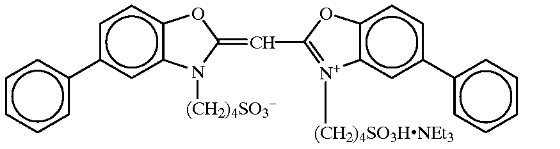

Sedimenting agent (e)

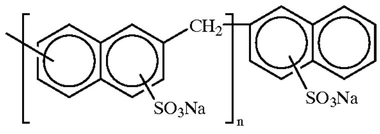

Antifoggant (f)

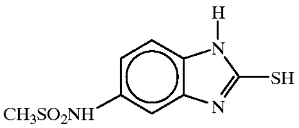

Compound (g)

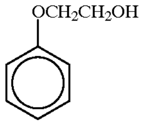

Light-Sensitive Silver Halide Emulsion (3) [for Blue Sensitive Emulsion Layer].

First, addition of solution (2) shown in Table 3 to a well-stirred aqueous solution of 5% gelatin (a solution of 31.6 g of gelatin, 2.5 g of potassium bromide, and 13 mg of compound (a) in 584 ml of water heated at 70° C.) is started. After 10 minutes addition of solution (1) is started. Solutions (1) and (2) are thereafter added for 30 minutes. Five minutes after termination of addition of solution (2), addition of solution (4) shown in Table 3 is further started, and after 10 seconds, addition of solution (3) is started. Solution (3) was added for 27 minutes and 50 seconds, and solution (4) is added for 28 minutes. After washing and salt removal (conducted using sedimenting agent (e) at pH 3.9) by a conventional method, 24.6 g of lime treated ossein gelatin and 56 mg of compound (b) are added to adjust the pH and the pAg to 6.1 and 8.5, respectively. Then 0.55 mg of sodium thiosulfate is added, followed by optimum chemical sensitization at 65° C. Thereafter, 0.35 g of sensitizing dye (h), 56 mg of antifoggant (i), and 2.3 ml of compound (g) as a preservative are added, followed by cooling. Thus, 582 g of a monodisperse octahedral silver bromide emulsion having a mean grain size of 0.55 μm is obtained.

TABLE 3

| | Solution (1) | Solution (2) | Solution (3) | Solution (4) |
|---|---|---|---|---|
| $AgNO_3$ | 15.8 g | — | 72.2 g | — |
| $NH_4NO_3$ | 68.0 mg | — | 308 mg | — |
| KBr | — | 11.4 g | — | 52.2 g |
| Amount Completed | Water to make 134 ml | Water to make 134 ml | Water to make 194 ml | Water to make 195 ml |

Sedimenting Agent (e')

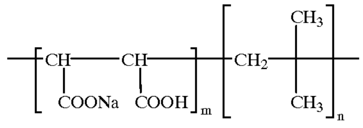

m + n = 1

Dye (h)

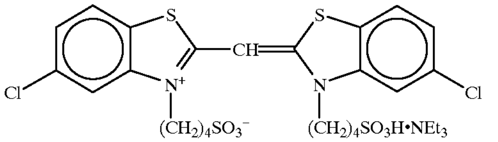

Antifoggant (i)

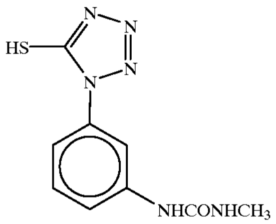

Benzotriazole Silver Emulsion (Organic Silver Salt)

In 300 ml of water, 28 g of gelatin and 13.2 g of benzotriazole are dissolved. The resulting solution was maintained at 40° C. and stirred. A solution of 17 g of silver nitrate in 100 ml of water is added to this solution for 2 minutes. The pH of the resulting benzotriazole silver emulsion is adjusted to remove excess salts by sedimentation. Then the pH is adjusted to 6.30 to obtain 400 g of a benzotraizole silver emulsion.

Method for Preparing Emulsified Dispersions of Couplers.

The oil phase ingredients and aqueous phase ingredients shown in Table 4 are each dissolved to form homogeneous solutions having a temperature of 60° C. Both the solutions are combined and dispersed in a 1-liter stainless steel vessel with a dissolver equipped with a 5 cm diameter disperser at 10,000 rpm for 20 minutes. Then hot water is added in amounts shown in Table 4 as post water addition, followed by mixing at 2,000 rpm for 10 minutes. Thus, emulsified dispersions of three colors of cyan, magenta, and yellow are prepared.

TABLE 4

| | | Cyan | Magenta | Yellow |
|---|---|---|---|---|
| Oil Phase | Cyan Coupler (1) | 4.64 g | — | — |
| | Magenta Coupler (2) | — | 3.18 g | — |
| | Yellow Coupler (3) | — | — | 2.96 g |
| | Developing Agent (4) | 1.78 g | 1.78 g | 1.78 g |
| | Antifoggant (5) | 0.08 g | 0.08 g | 0.08 g |
| | High Boiling Solvent (6) | 4.08 g | 4.85 g | 3.83 g |
| | Ethyl Acetate | 24 ml | 24 ml | 24 ml |
| Aqueous Phase | Lime-Treated Gelatin | 5.0 g | 5.0 g | 5.0 g |
| | Surfactant (7) | 0.40 g | 0.40 g | 0.40 g |
| | Water | 75.0 ml | 75.0 ml | 75.0 ml |
| | Post Water Addition | 60.0 ml | 60.0 ml | 60.0 ml |

Cyan Coupler (1)

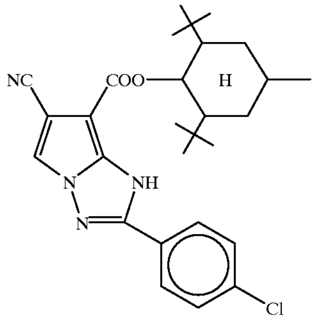

Magenta Coupler (2)

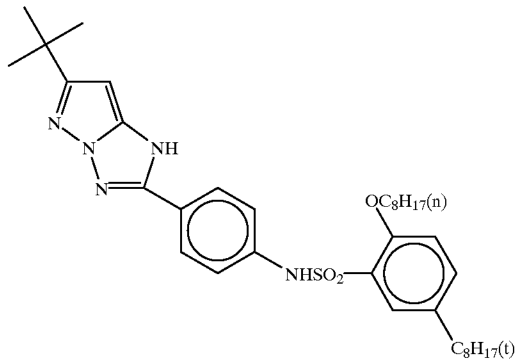

Yellow Coupler (3)

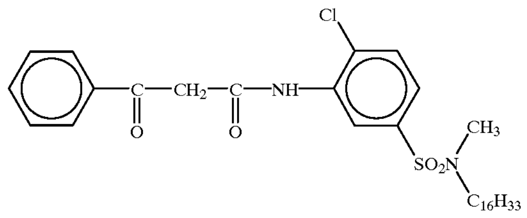

TABLE 4-continued

Developing Agent (4)

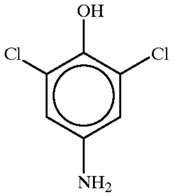

Antifoggant (5)

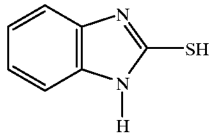

High Boiling Solvent (6)

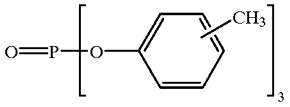

Surfactant (7)

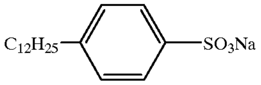

Using the material thus obtained, heat development color photographic material having the multilayer constitution shown in Table 5 is prepared. Annealed polyethylenenaphthalate (APEN) containing an effectively transparent coating of magnetic particles suitable for use as a magnetic recording medium is used as a film base. This film is loaded in a thrust cartridge, and the thrust cartridge is inserted into a camera and imagewise exposed to a full color test scene. The film is then rewound into the thrust cartridge, removed from the camera, and inserted into the chamber for accepting the thrust cartridge of the apparatus of the invention. The lighttight door of the apparatus of this invention is closed and the film drive mechanism is activated to thrust the film along the film path into the accumulator. The magnetic reader reads magnetic information stored on the film. The electronic record of this magnetic information is used to control and modify the thermal processing conditions and the electronic record of the magnetic information is stored in an electronic storage device. The temperature of the heater is adjusted and set in accordance to the magnetic information stored on the film. The drive speed is adjusted to provide for a development time in accordance to the magnetic information stored on the film. The film is driven past the heater to effect thermal development. The processed film is then driven past the magnetic writer which writes magnetic information onto the film. The film is then driven past the illuminated light source of the optical scanner. The light transmitted through the film is reflected by a mirror through a lens system onto a tri-linear CCD array photodetector. Parameters of the photodetector such as relative red green and blue exposure times are adjusted electronically to optimize scanning conditions in response to information stored magnetically on the film. The tri-linear photodetector array faithfully produces an electronic file representation of the film image data. This electronic file is manipulated to correct color and tone scale and the file is output to a digital printer. Inspection of the digital print reveals that the full color image scene is faithfully reproduced by this photothermographic system. The film is rewound into the thrust cartridge and removed from the apparatus of the invention.

TABLE 5

| Layer Constitution | Material Added | Amount Added (mg/m²) |
|---|---|---|
| 6th Layer | Lime-Treated Gelatin | 1940 |
| Protective Layer | Matte Agent (Silica) | 200 |
| | Surfactant (8) | 50 |
| | Surfactant (9) | 300 |
| | Base Precursor(10) | 1400 |
| | Water-Soluble Polymer (11) | 120 |
| 5th Layer | Lime-Treated Gelatin | 2000 |
| Yellow Color | Blue-Sensitive Silver Halide | 1250 |
| Forming Layer | Emulsion | (converted to silver) |
| | Benzotriazole Silver Emulsion | 300 |
| | | (converted to silver) |
| | Yellow Coupler (3) | 600 |
| | Developing Agent (4) | 360 |
| | Antifoggant (5) | 16 |
| | High Boiling Solvent (6) | 774 |
| | Surfactant (7) | 80 |
| | Heat Solvent (12) | 1400 |
| | Surfactant (9) | 70 |
| | Water-Soluble Polymer (11) | 40 |
| 4th Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| 3rd Layer | Lime-Treated Gelatin | 1000 |
| Magenta Color | Green-Sensitjve Silver Halide | 625 |
| Formation Layer | Emulsion | (converted to silver) |
| | Benzotriazole Silver Emulsion | 150 |
| | | (converted to silver) |
| | Magenta Coupler (2) | 320 |
| | Developing Agent (4) | 180 |
| | Antifoggant (5) | 8 |
| | High Boiling Solvent (6) | 490 |
| | Surfactant (7) | 40 |
| | Heat Solvent (12) | 700 |
| | Surfactant (9) | 35 |
| | Water-Soluble Polymer (11) | 20 |
| 2nd Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| 1st Layer | Lime-Treated Gelatin | 1000 |
| Cyan Color | Red-Sensitive Silver Halide | 625 |
| Formation Layer | Emulsion | (converted to silver) |
| | Benzotriazole Silver Emulsion | 150 |
| | | (converted to silver) |
| | Cyan Coupler (1) | 470 |
| | Developing Agent (4) | 180 |
| | Antifoggant (5) | 8 |
| | High Boiling Solvent (6) | 410 |
| | Surfactant (7) | 40 |
| | Heat Solvent (12) | 700 |
| | Surfactant (9) | 35 |
| | Water-Soluble Polymer (11) | 20 |
| Transparent PET Base (102 μm) | | |

Surfactant (8)

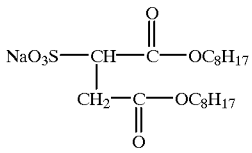

TABLE 5-continued

Surfactant (9)

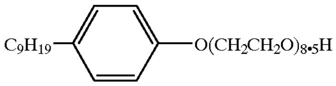

Base Precursor (10)

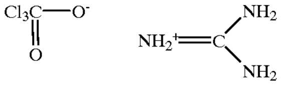

Water-Soluble Polymer (11)

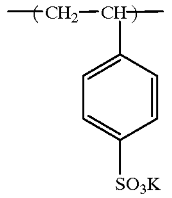

Heat Solvent (12)
D-Sorbitol

The invention has been described in detail with particular reference to certain preferred embodiments thereof, but it will be understood that variations and modifications can be effected within the spirit and scope of the invention.

What is claimed is:

1. An apparatus for thermal development comprising a receiving chamber for a thrust cartridge, drive means to advance thermal film from said thrust cartridge and rewind film into said thrust cartridge, an accumulator to gather said film after it has left the cartridge, a heater located between said chamber and said accumulator to develop said thermal film as it passes between said cartridge and said accumulator, an image scanner means for forming an electronic record of the visual image on the developed thermal film, and a light tight container for said chamber, heater, and accumulator.

2. The apparatus of claim 1 wherein said apparatus further includes means for magnetic reading of said thermal film.

3. The apparatus of claim 2 wherein said apparatus further includes means for magnetic writing to said thermal film.

4. The apparatus of claim 2 wherein said apparatus further comprises an information processor and digital storage device to store electronic record of magnetic information.

5. The apparatus of claim 2 further comprising means for regulating the thermal processing conditions in response to information sensed by said magnetic reader.

6. The apparatus of claim 2 further comprising means for regulating the optical scanning conditions in response to information sensed by said magnetic reader.

7. The apparatus of claim 2 wherein said apparatus further comprises means to retract magnetic heads during thermal processing or optical scanning.

8. The apparatus of claim 1 wherein said apparatus further comprises means for forming an electronic file representation of the scanned film image.

9. The apparatus of claim 1 wherein said image scanner is an optical scanner.

10. The apparatus of claim 1 wherein said apparatus further comprises an information processor and digital storage device to store electronic file representation of the scanned film image.

11. The apparatus of claim 1 wherein said apparatus further includes resident signal processing hardware for manipulating the electronic record.

12. The apparatus of claim 1 wherein said apparatus further includes means for communicating with signal processing hardware connected to said apparatus.

13. The apparatus of claim 1 wherein said image scanner sensor comprises a tri-linear array of photosensitive cells.

14. The apparatus of claim 10 wherein said photosensitive cells comprise charge coupled devices or complementary metal oxide semiconductor devices.

15. The apparatus of claim 1 wherein the light source for said scanner comprises light emitting diodes or fluorescent lamps.

16. The apparatus of claim 1 further comprising means to regulate optical scanning conditions in response to control signals.

17. The apparatus of claim 1 further comprising temperature sensing means to determine the temperature of said heater.

18. The apparatus of claim 2 further comprising means to regulate the temperature of said heater and the speed of said drive means.

19. The apparatus of claim 1 wherein said heater comprises a platen and said platen is between 2 and 5 cm in length.

20. The apparatus of claim 1 wherein said apparatus further comprises means to retract heater during optical scanning or magnetic reading or magnetic writing.

21. The apparatus of claim 1 wherein said light tight container is less than 1200 cc.

22. A method of developing thermal film comprising placing a thrust cartridge containing exposed thermal film into a receiving chamber, driving said thermal film from said chamber past a heater, taking up the developed film after it has passed over the heater in an accumulating means, image scanning aid film to produce an electronic record, digitizing the electronic record, storing the electronic record, and rewinding said thermal film into said thrust cartridge.

23. The method of claim 22 wherein the thrust cartridge containing developed thermal film is removed from said chamber.

24. The method of claim 22 wherein said heater is maintained at between 50 to 180° C.

25. The method of claim 22 wherein said heater temperature is regulated in response to a temperature sensing device.

26. The method of claim 22 wherein the developing is carried out in a lighttight container.

27. The method of claim 22 wherein said light tight container has a volume of about 1200 cc.

28. The method of claim 22 wherein said image scanning is by optical scanning.

29. The method of claim 22 wherein further including utilizing resident electronic signal processing and memory to regulate scanning of the image.

30. The method of claim 22 wherein further including utilizing resident electronic signal processing and digital memory to store electronic file representation of scanned film image.

31. The method of claim 22 further including controlling scanning in response to data optically stored on said thermal film.

32. The method of claim 22 further including controlling scanning in response to data magnetically stored on said thermal film.

33. The method of claim 22 wherein further including utilizing resident signal processing hardware for manipulating the electronic record of the scanned film image.

34. The method of claim 22 wherein further including utilizing means for communicating with signal processing hardware connected to said apparatus.

35. The method of claim 22 further including controlling thermal processing in response to data optically stored on said thermal film.

36. The method of claim 22 further including controlling thermal processing in response to data magnetically stored on said thermal film.

37. The method of claim 22 wherein further including writing magnetic information onto said thermal film regarding thermal processing conditions.

38. The method of claim 22 wherein further including writing magnetic information onto said thermal film regarding optical scanning conditions.

* * * * *